No. 752,981. PATENTED FEB. 23, 1904.
J. JOHNSON.
POTATO DIGGER.
APPLICATION FILED JUNE 17, 1903.
NO MODEL. 3 SHEETS—SHEET 1.
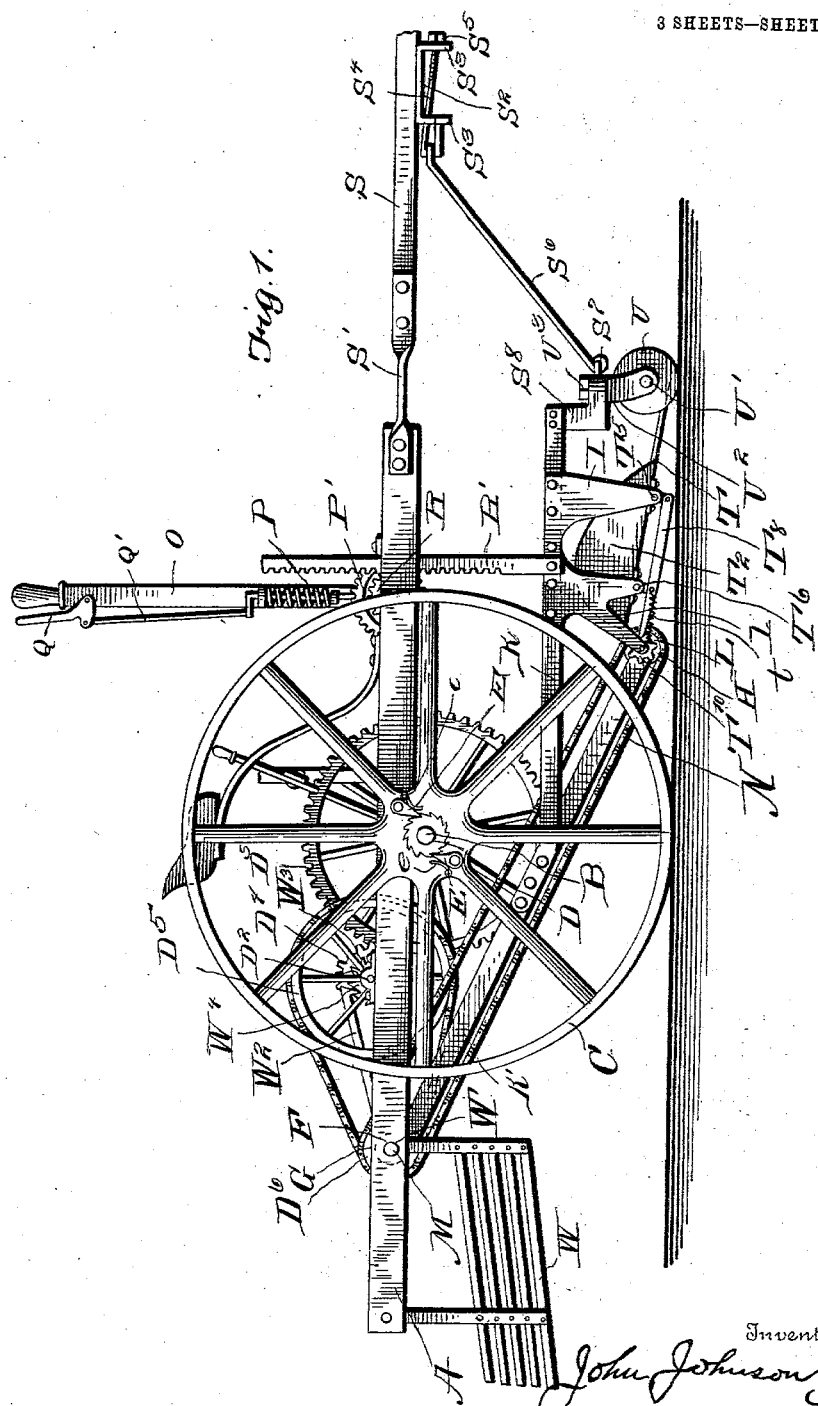

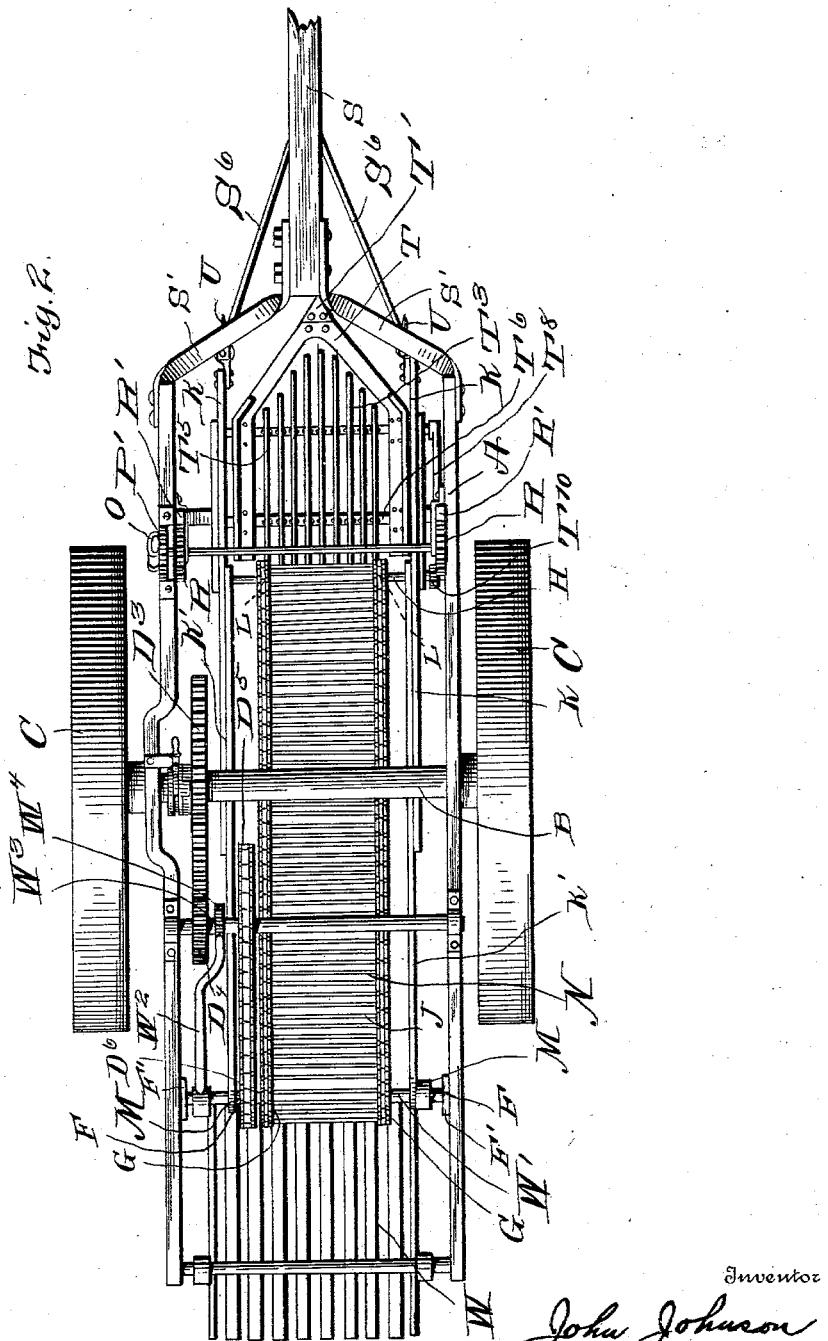

No. 752,981. PATENTED FEB. 23, 1904.
J. JOHNSON.
POTATO DIGGER.
APPLICATION FILED JUNE 17, 1903.
NO MODEL. 3 SHEETS—SHEET 3.
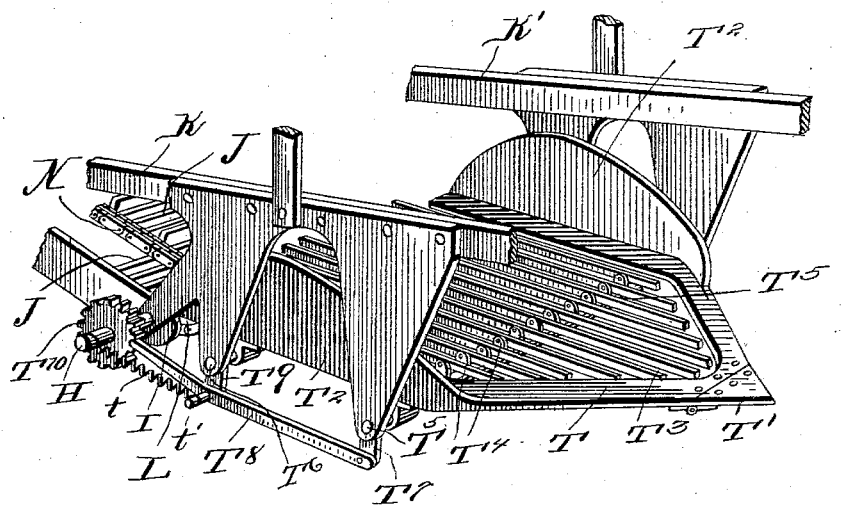
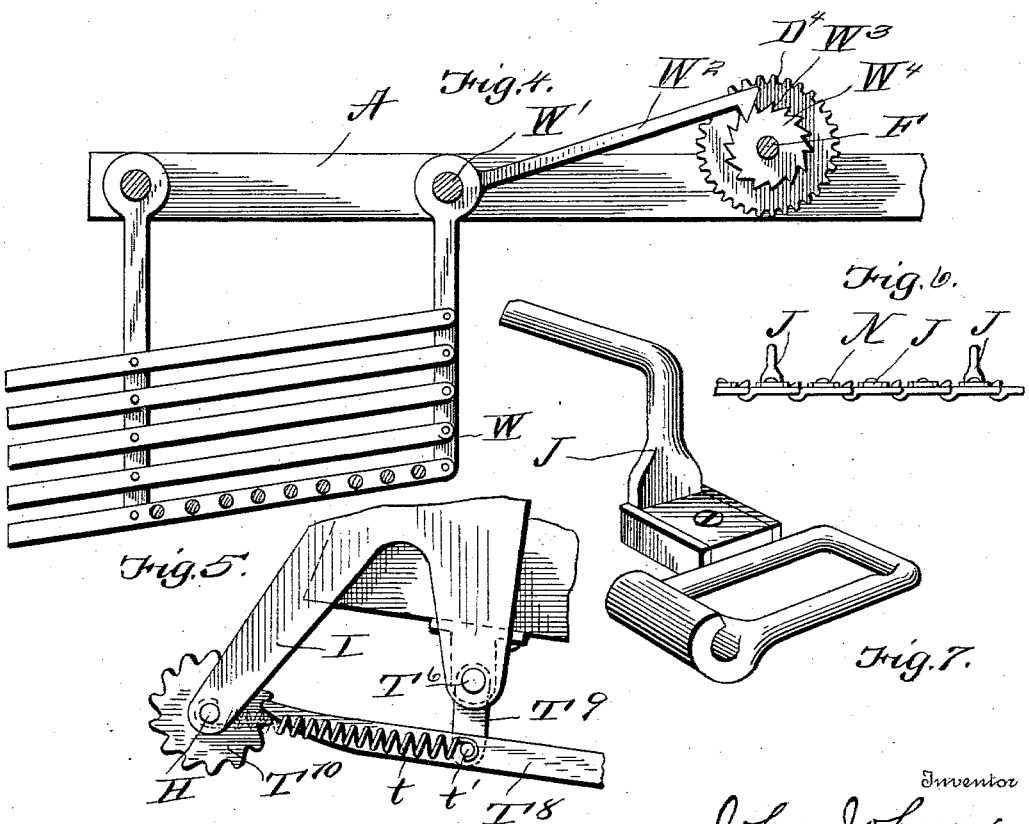
Witnesses
R. A. Boswell.
N. C. Mayhew.
Inventor
John Johnson
By A. L. Hough
Attorney No. 752,981. Patented February 23, 1904.

UNITED STATES PATENT OFFICE.

JOHN JOHNSON, OF LOWVILLE, NEW YORK, ASSIGNOR OF ONE-HALF TO WILLIAM L. ELLIOTT, OF LOWVILLE, NEW YORK.

POTATO-DIGGER.

SPECIFICATION forming part of Letters Patent No. 752,981, dated February 23, 1904.

Application filed June 17, 1903. Serial No. 161,904. (No model.)

*To all whom it may concern:*

Be it known that I, JOHN JOHNSON, a citizen of the United States, residing at Lowville, in the county of Lewis and State of New York, have invented new and useful Improvements in Potato-Diggers, of which the following is a specification.

This invention relates to new and useful improvements in potato-diggers; and it consists of a truck having adjustably mounted thereon a plow with a vibrating rack adjacent thereto, upon which the dirt and potatoes loosened by the plow are thrown, the dirt being partially separated from the potatoes as the bars of the rack are given sudden longitudinal movements, causing the potatoes to jump toward an endless conveyer, up which they are conveyed and deposited upon another rack prior to their being delivered to any suitable receptacle which may be attached to the truck.

The invention consists, further, in the provision, in a potato-digger, of means for regulating the depth at which it may be desired to allow the plow to enter the ground, of mechanism for cutting the earth on either side of a row of potatoes to allow the plow to readily scoop up the potatoes, with the immediate earth surrounding same, and in various other details of construction and in combinations of parts, as will be hereinafter more fully described and then specifically defined in the appended claims.

My invention is clearly illustrated in the accompanying drawings, which, with the letters of reference marked thereon, form a part of this application, and in which drawings similar letters of reference indicate like parts in the several views, in which—

Figure 1 is a side elevation of my improved potato-digger. Fig. 2 is a top plan view. Fig. 3 is a detail perspective view of the plow and vibrating rack adjacent thereto and a portion of the conveyer. Fig. 4 is a detail in elevation of the rack on which the potatoes fall from the endless conveyer. Fig. 5 is a detail of the ratchet-wheel and rod riding on the circumference thereof for actuating the rack adjacent to the plow. Fig. 6 is a detail view of a portion of the carrier, and Fig. 7 is a perspective view of one of the links of the carrier and rods secured to said links.

Reference now being had to the details of the drawings by letter, A designates the truck of the machine, with axle B mounted in suitable bearings thereon. Wheels C are journaled on the ends of said axles, and a ratchet-wheel D is fixed to one end of said shaft and is engaged by pawls E E, pivotally mounted on one of the wheels, said pawls being normally in engagement with the teeth of the ratchet-wheel D and held in such relation by means of springs $e$ $e$. Said pawls are so arranged with reference to the ratchet-wheel that as the machine is moving forward the driving-wheel carrying the pawls will cause the shaft to rotate and in turn cause the endless conveyer to operate.

Journaled in bearings F' on the truck is a shaft F, to which sprocket-wheels G are keyed, and a second shaft H is journaled in the bracket-arms I, fastened to the beams K of the truck, and suitable sprocket-wheels L L are keyed to said shaft H. An endless conveyer N passes about said sprocket-wheels and is so arranged that the forward end of the conveyer may be raised and lowered with the beams K and K', which latter are pivotally connected at M to the truck. The two chains of the endless conveyer, which pass over the sprocket-wheels G and L at the ends of the shafts F and H, respectively, are connected together, preferably with rods J, which are angled near their ends, which are fastened to the links of the chains, and at intervals portions of the rods project farther from the conveyer than intermediate rods, thereby providing means whereby the potatoes are prevented from rolling down the conveyer as they are being elevated by the latter.

Pivotally mounted on the truck of the machine is a lever O, carrying a spring-actuated pawl P, the free end of which pawl is normally in engagement with a toothed segment-plate P', fixed to the truck. A hand-lever Q is pivoted on said lever O and is connected by a rod Q' with the angled end of the dog P. Mounted to rock with the lever O is a segment-gear R, which is in mesh with the teeth of a rack-bar R', the lower end of which bar is fixed to the beam K and held in engagement with said segment-gear by any suitable means.

S designates a tongue of the machine, which is connected to the beams of the truck by the bars S', and fastened to the under side of said tongue is a plate S², having downwardly-disposed angled ends S³, which are apertured to receive the threaded shank portion of the hook S⁴. A nut S⁵ is fitted on the threaded end of said hook, as shown clearly in Fig. 1, and a rod S⁶ is connected at one end to said hook, and its other end is fastened to an eye S⁷ upon the angle-plate S⁸, which is bolted to the end of the beam K. By means of said threaded rod and connections with the beam K the plow, carrying a truck, may be supported. Said plow T, an enlarged detail view of which is illustrated in Fig. 3, has a removable point T' and vertical sides T², and between the vertical sides and adjacent to the point is a series of vibrating rods or bars T³, which are pivoted to lugs T⁴, mounted upon the rock-shafts T⁵ and T⁶, which latter are journaled in the bracket-arms I. A crank-arm T⁷ is fitted to or integral with said shaft T⁵ and has pivotally connected therewith one end of a reciprocating rod T⁸, while a similar crank-arm T⁹ on shaft T⁶ has pivotal connection also with the rod T⁸. On the extended end of the shaft H is fixed a ratchet-wheel T¹⁰, and the free end of said rod T⁸ is normally held against the teeth about the circumference of said ratchet-wheel by means of a spring $t$, which latter is fastened at one end to a pin $t'$ and its other end to the end of shaft H. (Clearly shown in Fig. 3.)

In order to cut the earth on either side of the row of potatoes, I provide two colters U, which are journaled on the pins U', carried by the yokes U², having a shank portion held to the angle-plate S⁸ by means of a nut U³. By the use of these colters the ground will be loosened somewhat, rendering it more easy for the plow to scoop up the potatoes and dirt of the hills.

Immediately at the rear of the conveyer is provided a rack W, the rods of which are fastened to a rock-shaft W', which is journaled in the truck-frame, and a rod W², fixed at one end to said rock-shaft, has its free end resting upon the teeth W³ of the ratchet-wheel W⁴, which is mounted upon and rotates with a shaft D². As the shaft W' is rocked it will be noted that the rods W will be given a vibratory movement sufficient to separate any dirt which may cling to the potatoes as they drop from the conveyer, and the potatoes will be thrown off the rack and may be caught in any receptacle held adjacent to the rack.

Motion is imparted from the main driving-shaft to the endless conveyer through the medium of the gear-wheel D³, which is keyed to the shaft B, and gear-wheel D⁴, in mesh with gear-wheel D³, and from shaft D², to which is keyed a sprocket-wheel D⁵, to a sprocket-wheel D⁶ on shaft F.

The operation of my machine is simple and will be readily understood. The height at which it is desired to have the plow-carrying truck held is regulated by means of the adjusting-hook S⁴. The truck is drawn astride a row of potatoes, the colters will cut both sides of the hill, and the point of the plow will cut under the hill, and the dirt and potatoes of the hill will be deposited upon the vibrating bars T³, and the dirt being sifted between the bars the potatoes will be thrown back upon the longitudinally-moving bars by a jumping movement, the pitch of said bars being of such a slight inclination as to allow the potatoes to readily pass to the conveyer, up which they are carried by the rods connecting the chains of the conveyer and deposited upon the vibrating rack at the upper end of the conveyer. From the rack at the rear end of the conveyer the potatoes will be jarred off and may be caught by any suitable receptacle. By the provision of the pivoted hand-lever O the plow and forward portion of the conveyer may be lifted from the ground by the operator in case it is desired for any purpose, and any suitable clutch mechanism within convenient reach of the seat of the machine may be employed to throw the conveyer into and out of gear.

While I have shown and described a particular form of apparatus embodying the features of my potato-digger, it will be understood that I may make alterations in the construction of the machine, if desired, without departing from the spirit of the invention.

Having thus described my invention, what I claim to be new, and desire to secure by Letters Patent, is—

1. A potato-digger comprising a truck, a conveyer-frame, an endless conveyer mounted thereon, a plow supported by beams projecting from the conveyer-frame, a vibrating rack made up of longitudinal strips, rock-shafts journaled underneath the plow and provided with integral lugs to which the strips of said rack are pivotally connected, crank-arms upon said rock-shafts, pitman connections between said crank-arms, and means actuated by said conveyer for rocking the shafts to impart a longitudinal movement to the rack, whereby potatoes may be jumped up the inclined surface of the rack and deposited upon said conveyer, as set forth.

2. A potato-digger comprising a truck, a conveyer-frame, an endless conveyer mounted thereon, a plow supported by the beams projecting from the conveyer-frame, a vibrating rack comprising longitudinal strips spaced apart and of varying lengths, the longest strips being positioned at the center of the rack and graduating in length toward the opposite sides of the plow, rock-shafts journaled underneath the plow and having integral lugs pivoted to the strips of said rack, crank-arms upon said shafts, a pitman pivotally connecting said crank-arms, and means actuated by said conveyer for imparting a longitudinal movement to the rack, whereby potatoes may be jumped up the inclined surface of the rack and deposited upon said conveyer, as set forth.

3. A potato-digger comprising a truck, a conveyer-frame, an endless conveyer mounted thereon, a plow supported by beams projecting from the conveyer-frame, depending bracket-arms secured to said beams, rock-shafts journaled in said bracket-arms, lugs integral with said rock-shafts, longitudinal strips of graduated lengths pivotally mounted upon said lugs and confined within the opening of the plow, means actuated by said conveyer for imparting a longitudinal movement to the rack, whereby potatoes may be jumped up the inclined surface of the rack and deposited upon said conveyer, and means for holding the conveyer in an adjusted position, as set forth.

4. A potato-digger comprising a truck, a tongue secured thereto, a conveyer-frame, an endless conveyer mounted thereon, a plow supported by beams projecting from the conveyer-frame, a vibrating rack made up of longitudinal strips of graduated length, rock-shafts having lugs to which said strips are secured, a pitman connecting the rock-shafts, means actuated by said conveyer for imparting a longitudinal movement to the rack, whereby potatoes may be jumped up the inclined surface of the rack and deposited upon said conveyer, a hooked rod secured to said tongue and having a nut fitted on the threaded end thereof, a rod connecting said hook with said beam of the conveyer-frame, as set forth.

5. A potato-digger comprising a truck, a tongue secured thereto, a conveyer-frame, an endless conveyer mounted thereon, a plow supported by beams projecting from the conveyer-frame, a vibrating rack made up of longitudinal strips of graduated length, rock-shafts having lugs to which said strips are secured, a pitman connecting the rock-shafts, means actuated by said conveyer for imparting a longitudinal movement to the rack, whereby potatoes may be jumped up the inclined surface of the rack and deposited upon said conveyer, a bracket-arm secured to said tongue having downwardly-extending ends which are apertured, a hooked rod mounted in said apertures of the bracket-arm, a nut mounted on the threaded end of the hook, and a rod connecting the hook with said beam, as set forth.

6. A potato-digger comprising a truck, a conveyer-frame, an endless conveyer mounted thereon, a plow supported by beams projecting from the conveyer-frame, a vibrating rack made up of longitudinal strips of graduated lengths, rock-shafts having lugs to which said strips are secured, a pitman connecting said rock-shafts, and means actuated by said conveyer for imparting a longitudinal movement to the rack, whereby potatoes may be jumped up the inclined surface of the rack and deposited upon said conveyer, as set forth.

7. A potato-digger comprising a truck, a conveyer-frame, an endless conveyer thereon, forwardly-projecting beams secured to the conveyer-frame, plates secured to the faces of said beams and having downwardly-projecting arms, a plow supported intermediate the plates, shafts journaled in said arms and having lugs projecting therefrom, a rack made up of strips which are pivotally secured to said lugs and positioned in an open space intermediate the sides of the plow, and means actuated by the conveyer for rocking said shafts to impart a longitudinal reciprocating movement to the strips of the rack, whereby the potatoes may be jumped up in their inclined faces and deposited upon the conveyer, as set forth.

8. A potato-digger, comprising a truck, a conveyer-frame, an endless conveyer mounted thereon and means for actuating said conveyer, a plow supported by said conveyer-frame, a vibrating rack intermediate the plow and conveyer, a ratchet-wheel on one of the conveyer-shafts, a reciprocating rod connected by crank-arms to the vibrating rack, and a spring for holding one end of said rod against the circumference of said ratchet-wheel, as set forth.

9. A potato-digger, comprising a truck, an endless conveyer and means for driving the latter, a plow connected to said frame, a rack intermediate said plow and conveyer and comprising rock-shafts with bars secured thereto, crank-arms secured to said shafts, a ratchet-wheel on one of the conveyer-shafts, a rod pivotally connecting said crank-arms, and having a free end held in contact with the circumference of said ratchet-wheel, a plow having vertical sides along the marginal edges of the rack, as set forth.

In testimony whereof I have signed my name to this specification in the presence of two subscribing witnesses.

JOHN JOHNSON.

Witnesses:
FRANK L. BOSTWICK,
P. J. BEHRIN.